United States Patent [19]

Schrödter et al.

[11] 4,271,128
[45] Jun. 2, 1981

[54] APPARATUS FOR RECOVERING ALCOHOLIC PHOSPHORIC ACID SOLUTIONS FROM ACID PHOSPHATES

[75] Inventors: Klaus Schrödter, Cologne; Wolfgang Scheibitz, Hürth-Knapsack; Klaus-Peter Ehlers, Erftstadt-Iechenich, all of Fed. Rep. of Germany

[73] Assignee: Hoechst Aktiengesellschaft, Fed. Rep. of Germany

[21] Appl. No.: 72,056

[22] Filed: Sep. 4, 1979

Related U.S. Application Data

[60] Division of Ser. No. 945,501, Sep. 25, 1978, Pat. No. 4,203,956, which is a continuation of Ser. No. 765,639, Feb. 4, 1977, abandoned.

[30] Foreign Application Priority Data

Feb. 10, 1976 [DE] Fed. Rep. of Germany ....... 2605106

[51] Int. Cl.³ .................. B01D 11/04; B01F 3/08; B01J 19/24
[52] U.S. Cl. ................................. 422/189; 422/228; 422/258
[58] Field of Search ............... 422/188, 189, 225, 228, 422/230, 234, 256, 258; 423/307, 308, 312, 321 S

[56] References Cited

U.S. PATENT DOCUMENTS

| | | | |
|---|---|---|---|
| 1,297,171 | 3/1919 | Holley et al. | 422/189 |
| 2,698,219 | 12/1954 | Martin | 422/225 X |
| 2,754,179 | 7/1956 | Whatley | 422/225 X |
| 3,544,079 | 12/1970 | Dressler | 422/258 X |
| 3,723,606 | 3/1973 | Klingelhoefer et al. | 423/321 S |
| 3,872,215 | 3/1975 | Cherdron et al. | 423/312 X |
| 3,997,445 | 12/1976 | Hannestad | 422/256 X |

*Primary Examiner*—Bradley Garris
*Attorney, Agent, or Firm*—Connolly and Hutz

[57] ABSTRACT

For extracting phosphates with alcohol in the presence of water and a strong mineral acid, with the resultant formation of an alcoholic phosphoric acid solution and an aqueous salt phase, a plurality of mixing settlors are arranged one upon another, so that the bottom outlet for the aqueous salt phase of each mixing settlor serves as the feeder for the next mixing settlor below and the outlet for the alcoholic solution of each settlor is connected with the feed pipe for this solution of the next mixing settlor above. Each mixing settlor is subdivided by means of two partitions into a mixing chamber A, a separating chamber B and a settling chamber C. The said two partitions do not extend to the bottom of the mixing settlor and are arranged so that the three chambers A, B and C communicate with one another.

3 Claims, 1 Drawing Figure

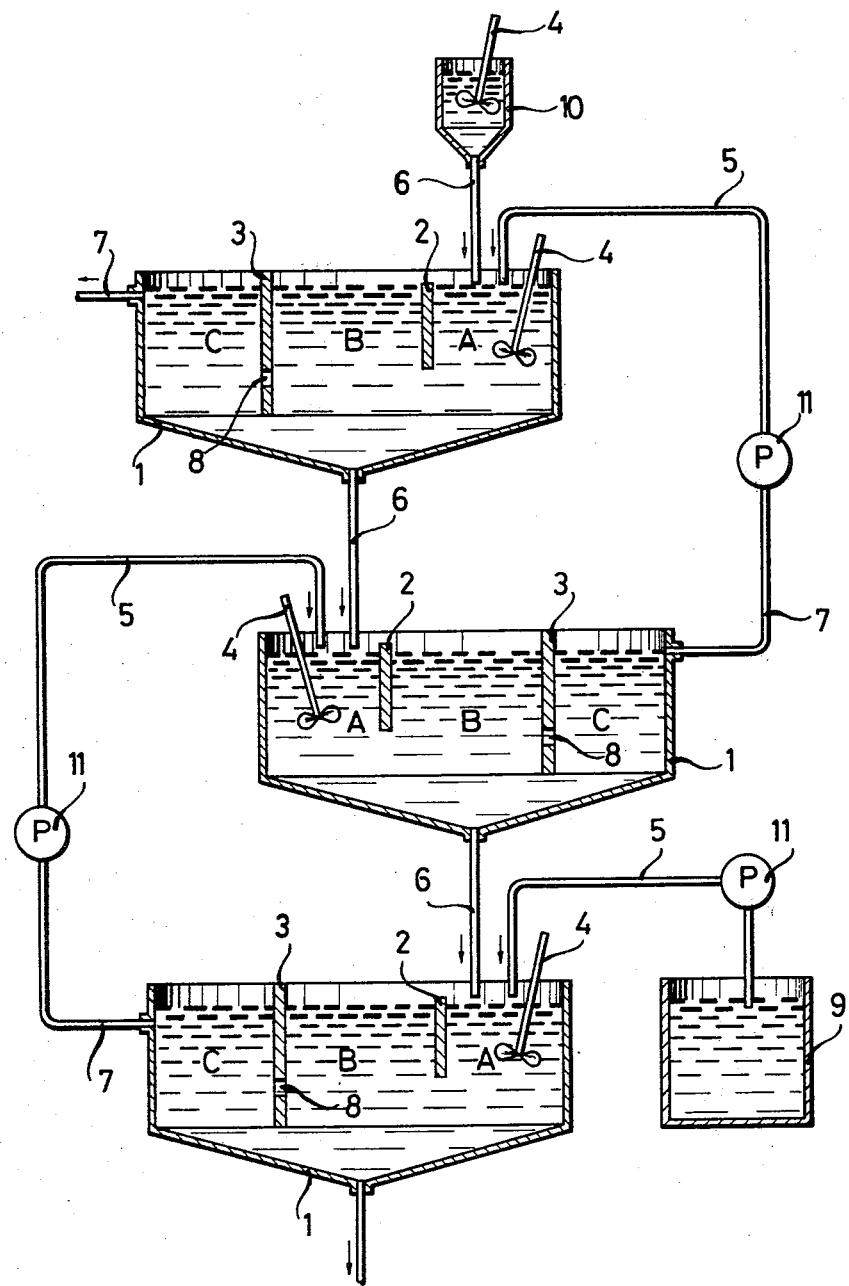

APPARATUS FOR RECOVERING ALCOHOLIC PHOSPHORIC ACID SOLUTIONS FROM ACID PHOSPHATES

This application is a division of application Ser. No. 945,501 filed Sept. 25, 1978 now U.S. Pat. No. 4,203,956 issued May 20, 1980 which is a continuation of application Ser. No. 765,639 filed Feb. 4, 1977 now abandoned.

The present invention relates to a process for recovering alcoholic phosphoric acid solutions from acid phosphates or phosphate mixtures in the presence of water and a strong mineral acid by extraction with an alcohol.

It is known that acid phosphates or phosphate mixtures, which are in the form of a solution or sludge containing considerable proportions of salt, are obtained in various commercial processes. Crude phosphoric acid, for example, which is obtained by processing crude phosphate with sulfuric acid, is purified by extraction with an organic solvent. This results in the formation of an organic extract phase which is obtained together with large quantities of an aqueous raffinate phase, the latter consisting essentially of a mixture of acid phosphates which primarily comprise iron, aluminum and magnesium phosphates.

Acid iron or aluminum phosphates are also obtained as by-products in the chemical or electrochemical treatment of metals by means of a bath containing phosphoric acid.

Various processes, wherein the above salts or salt mixtures are treated in an attempt to recover $P_2O_5$ in the form of free phosphoric acid, have already been described which, however, are not satisfactory in respect of the yield and purity of the phosphoric acid obtained (cf. U.S. Pat. No. 3,872,215.)

The acid phosphates are more specifically reacted with concentrated mineral acid, generally with sulfuric acid. Phosphoric acid is set free by that treatment and the corresponding mineral acid salts are obtained. This is an equilibrium reaction in which it is necessary to use the mineral acid in excess in an attempt to convert the $P_2O_5$ present in the phosphate as quantitatively as possible to phosphoric acid.

As a result, the reaction mixture always contains free mineral acid.

In view of the fact that the salts obtained are relatively readily soluble, it is not possible to separate by filtration the phosphoric acid set free and residual mineral acid. It is rather necessary for the reaction mixture to be extracted by means of an organic solvent, in which the acids are soluble, but in which the salts are insoluble or only slightly soluble. The solvents used to this end include ethers, amines, esters and ketones, and more specifically alcohols of medium chain length, such as isopropanol, butanol or amyl alcohol.

The extraction of the reaction mixture with such solvents results in the formation of an aqueous salt phase, which consists of salts of the respective mineral acid and unreacted phosphate, and is obtained together with an organic extraction phase containing phosphoric acid and mineral acid.

Further extraction processes for purifying phosphoric acid have been described, wherein the free phosphoric acid is not freed from the phosphates present therein, but the components, i.e. acid and phosphate, are extracted jointly by means of an organic solvent in the presence of an excess of mineral acid. Also in this case, a substantial portion of $P_2O_5$ contained in the phosphates is converted to phosphoric acid which is again obtained together with extracted matter containing important proportions of mineral acid.

To obtain phosphoric acid substantially free from mineral acid, it is necessary in any case to subject the organic extract phase to special purifying treatment, for example, by precipitation with suitable chemicals or by scrubbing the extract with phosphoric acid or a phosphate salt solution. Needless to say such additional purification is expensive in respect of equipment and partially in respect of chemicals, and entails considerable loss of $P_2O_5$.

In other words, the processes used heretofore for recovering phosphoric acid from acid phosphates by reaction with mineral acid and extraction with an organic solvent are not satisfactory in respect of the following points:

(1) In an attempt to fairly quantitatively convert $P_2O_5$ present in acid phosphates to free phosphoric acid, it is necessary to use an excess of mineral acid.

(2) The resulting extract contains phosphoric acid in admixture with excess mineral acid, which must be separated by additional expensive treatment.

It is therefore an object of the present invention to provide a process, which is free from the disadvantageous effects described above and which permits phosphoric acid to be recovered in high yields from acid phosphates or phosphate mixtures, the phosphoric acid being obtained in an organic solvent phase substantially free from mineral acid.

In accordance with the present invention, the above object can unexpectedly be achieved by means of a process which comprises: contacting in countercurrent and thereby mixing an aqueous phosphate solution or suspension with a mixture of at least one alcohol having from 3 to 8 carbon atoms, preferably from 4 to 6 carbon atoms, and a strong mineral acid, the alcohol or alcohol mixture and the phosphate solution or suspension being used in a ratio by volume of 2:1 to 20:1, preferably 4:1 to 8:1, and the mineral acid being used in the quantity just necessary to transform the phosphate approximately quantitatively to phosphoric acid; establishing, in the alcohol or alcohol mixture, mineral acid and phosphate solution or suspension, the content of water necessary to ensure the formation of a mixture consisting of an alcoholic phase and a separate flowable salt phase; and separating the salt phase from the alcoholic phase.

The process may conveniently be carried out at temperature of 5° to 80° C., preferably 20° to 40° C.

The resulting alcoholic phosphoric acid solutions are further treated in known manner and phosphoric acid is recovered therefrom, e.g. by re-extracting it with water or by distilling off the alcohol.

The alcohols which are preferred in the present process comprise those which are partially or completely miscible with water, e.g. isopropanol, butanol, amyl alcohol and mixtures therof.

It is good practice to use the solvent in admixture with concentrated hydrochloric acid, preferably in admixture with sulfuric acid. With respect to the quantity of acid which is to be used in each particular case, it is necessary for it to be determined separately inasmuch as the various phosphates or phosphate mixture have been found to react differently with identical quantities of solvent and mineral acid, based on the respective $P_2O_5$-content of the phosphate salts. In other words, during the reaction of the various acid phosphates or phosphate mixtures with the quantity of mineral acid stoichiometrically necessary to convert the phosphate salts to phosphoric acid and neutral mineral salts, different quantities of phosphoric acid are set free so that it is possible for more or less consumed mineral acid to go forward together with phosphoric acid into the organic solvent phase.

The invention also provides an apparatus, such as that shown diagrammatically in the accompanying drawing, for carrying out the present process, which provides: for a plurality of mixing settlers 1 to be subdivided into a mixing chamber A, a separating chamber B and a settling chamber C, each of the individual mixing settlers being so subdivided by means of partitions 2 and 3 which extend vertically upwards in, and across the entire width of, the respective mixing settler; for the mixing chamber A to be provided with an agitator 4, a feed pipe 5 for an alcohol/mineral acid-mixture, and a feeder 6 for an aqueous phosphate solution or suspension for mixing the alcohol/mineral acid-mixture with the phosphate solution or suspension; for the separating chamber B receiving the mixture coming from the mixing chamber A to be used for separating said mixture into two liquid phases comprising a lower aqueous salt phase and an upper alcoholic phase containing phosphoric acid; for the settling chamber C to be provided in its upper half portion with an outlet 7 for the alcoholic phase; for the three chambers A, B and C to communicate with each other through the two partitions 2 and 3 terminating above the bottom of the respective mixing settler; for the first partition 2 between the mixing chamber A and separating chamber B to have a lower height than the second partition 3 between the separating chamber B and the settling chamber C; for the first partition 2 to be so arranged that its upper edge is at a level lower than the upper edge of the second partition 3 so as to permit a portion of the alcoholic phase, which is separated in the upper half portion of the separating chamber B, to be returned to the mixing chamber A; for the second partition 3 to reach with its lower edge down to a level lower than the lower edge of the first partition 2 and, unlike the first partition 2, to also reach into the aqueous salt phase accumulating downstream of the chambers A, B and C; for the second partition 3 to be provided with a passage opening 8 above the phase separation line of the two liquid phases separated from one another in the separating chamber B; for the individual mixing settlers 1 to be so arranged with respect to each other that the bottom outlet for aqueous salt phase of each mixing settler 1 simultaneously serves as the feeder 6 for the next mixing settler placed immediately downstream thereof; and for the outlet 7 of each individual mixing settler to be connected to the feed pipe 5 of the next following mixing settler.

Further preferred features of the present apparatus provide for the feed pipe 5 opening into the first mixing settler 1 to communicate with a container 9 for the alcohol/mineral acid-mixture; for the feeder 6 of the last mixing settler to communicate with a container 10 for the phosphate solution or suspension; and for the mixing settlers 1, preferably for three to six mixing settlers 1, to be arranged serially, i.e. with one downstream of another, the outlet 7 of each mixing settler 1 being connected by means of a pump 11 to the feed pipe of the next following mixing settler 1.

One of the unexpected results of the present invention resides in the fact that the present process even enables an aqueous suspension containing considerable proportions of solid matter to be contacted in countercurrent and multistagewise with an alcohol. To achieve this, the invention provides:

(a) for the system of salt, organic solvent and mineral acid to contain the quantity of water necessary to ensure the formation of a flowable salt magma in all processing stages. The water necessary to this end, may completely or partially originate from the phosphate suspension. In the latter case, it is good practice by the use of hydrous alcohols or mineral acid to introduce the necessary balance water into the above system;

(b) for the mixing settlers to be designed so as to permit the alcoholic phase and aqueous salt phase to be intimately mixed in the mixing chamber, and the resulting mixture to be directly delivered, in the absence of any pump or conduit, to the separating and settling chambers, in which the phases immediately undergo separation by reason of their great difference in density;

(c) for the aqueous salt phase to travel by gravity to the next following mixing settler, without the need to use a pump; and (d) for the quantity of aqueous salt phase which is taken from the respective mixing chamber to be so controlled by means of a pneumatically actuated valve that the phase boundary layer between the alcoholic phase and aqueous phase be maintained at a constant level. The alcoholic solution is removed through an overflow.

The process and apparatus of the present invention will now be described with reference to the accompanying drawing.

The salt solution or suspension coming from a tank 10 is delivered to the uppermost mixing settler 1 and from there to the mixing settlers downstream thereof, in which it is contacted in countercurrent with alcohol and mineral acid coming from a tank 9.

Each of the individual mixing settlers 1 is subdivided into three chambers. In mixing chamber A, the alcoholic phase is mixed with the aqueous salt phase, and the resulting mixture is continuously delivered below a first partition 2 to separating chamber B, in which the two phases commence separation. The less dense alcohol phase, which may still contain minor proportions of solid turbidity-inducing substances, partially travels across the first partition 2 into the mixing chamber A, and partially flows through a passsage opening 8 in the second partition 3 into chamber C which it leaves as a completely clarified phase. The second partition 3 is positioned so as to reach into the salt phase accumulating below the three chambers, so as to fully protect chamber C against the turbulence in chamber B, and so as to provide an effective settling chamber. Salt phase is taken from the mixing chamber through a pneumatically actuated valve which permits the boundary layer between the less dense and more dense phases to be maintained at a constant level.

The three-stage installation shown in the accompanying drawing was put to operation. An aqueous salt phase consisting substantially of salts of the mineral acid added was taken from the bottom portion of the lowermost mixing settler, and rejected. An alcoholic phase containing phosphoric acid was taken from the uppermost mixing settler.

The following Examples illustrate the advantages associated with the process of the present invention, which is compared with a process used heretofore for acid phosphate processing.

EXAMPLE 1: (Comparative Example)

The starting material was a phosphate mixture, which was obtained upon the extraction of crude phosphoric acid with an organic solvent and which was substantially composed of:

| | |
|---|---|
| $P_2O_5$ | 35.4 weight % |
| Fe | 1.2 weight % |
| Al | 0.8 weight % |
| Mg | 2.4 weight % |
| Ca | 0.5 weight % |
| $H_2O$ | 33.1 weight % |

6.1 l/h of the above acid phosphate mixture was treated in a three-stage countercurrent process with 36.8 l/h of a mixture of anhydrous amyl alcohol and concentrated sulfuric acid (96 weight % strength). The sulfuric acid was used in the quantity necessary to establish a molar ratio of 0.9:1, based on the $SO_4$-content of the alcohol and the $P_2O_5$-content of the phosphate.

39.9 l/h of an alcoholic extract, which contained 88% of the $P_2O_5$ initially present in the phosphate and 2 weight % of sulfate, based on $P_2O_5$, was taken from the uppermost mixing settler.

Comparative Example

For the purpose of comparison, 20 kg of the above phosphate mixture was admixed, with agitation, with 4.6 kg of concentrated sulfuric acid. The resulting reaction mixture was intimately mixed with 78 kg of anhydrous amyl alcohol and an aqueous salt phase was obtained together with an organic extract, which contained 76 weight % of the $P_2O_5$ initially present in the phosphate and 44 weight % of sulfate, based on $P_2O_5$. Only by increasing the sulfuric acid quantity to 10 kg while the phosphate and solvent quantities remained unchanged was it possible in this process to obtain a yield of 87 weight %, based on the $P_2O_5$ used. This, however, was associated with an increase of the sulfate content to 96 weight %, based on $P_2O_5$.

EXAMPLE 2

The starting material was a phosphate mixture which was obtained upon the extraction of crude phosphoric acid with an organic solvent, and which was composed of:

| | |
|---|---|
| $P_2O_5$ | 36.0 weight % |
| Fe | 6.0 weight % |
| Al | 2.7 weight % |
| Mg | 0.4 weight % |
| $H_2O$ | 32.1 weight % |

Water was added to increase the $H_2O$-content of the phosphate mixture to 39 weight %.

30 l/h of the suspension so made was treated in the three-stage countercurrent process shown diagrammatically in the accompanying drawing with 152 l/h of a mixture of isopropanol, which contained 25 weight % of water, and concentrated sulfuric acid (96 weight % strength). The sulfuric acid was used in the quantity necessary to establish a molar ratio of 1:0.7, based on the $SO_4$-content of the alcohol and the $P_2O_5$-content of the phosphate. The resulting extract contained 75% of the $P_2O_5$ used and 2 weight % of $SO_4$, based on $P_2O_5$.

Comparative Example

For the purpose of comparison, 30 kg of undiluted phosphate mixture was admixed, with agitation, with 7.7 kg of concentrated sulfuric acid. This corresponded to a $P_2O_5$: $SO_4$-ratio of 1:1. The resulting reaction mixture was thoroughly admixed with 62 kg of isopropanol containing 15 weight % of water. After the mixing operation and phase formation were complete, there was separated an alcoholic extract which contained 61 weight % of the $P_2O_5$ initially used, and 70 weight % of $SO_4$, based on $P_2O_5$.

To obtain in the above prior process the 79 weight % yield of the present countercurrent process, it was necessary to use 300% more sulfuric acid ($P_2O_5:SO_4=1:3$). For the use of identical quantities of solvent, the extract obtained contained more sulfuric acid than phosphoric acid, corresponding to 170 weight % of $SO_4$, based on $P_2O_5$.

We claim:

1. An apparatus for making alcoholic phosphoric acid solutions from acid phosphates or phosphate mixtures in the presence of water and a strong mineral acid by extraction with an alcohol, comprising a plurality of mixing settlers (1) subdivided into a mixing chamber (A), a separating chamber (B) and a settling chamber (C), each of the individual mixing settlers (1) being so subdivided by means of partitions (2) and (3) which extend vertically upwards in, and across the entire width of, the respective mixing settler (1); the mixing chamber (A) being provided with an agitator (4), a feed pipe (5) for an alcohol/mineral acid-mixture, and a feeder (6) for an aqueous phosphate solution or suspension for mixing the alcohol/mineral acid-mixture with the phosphate solution or suspension; the separating chamber (B) receiving the mixture coming from the mixture chamber (A), separating said mixture into two liquid phases comprising a lower aqueous salt phase and an upper alcoholic phase containing phosphoric acid; the settling chamber (C) being provided in its upper half portion with an outlet (7) for the alcoholic phase, whereby the three chambers (A), (B) and (C) communicate with each other through the two partitions (2) and (3) terminating above the bottom of the respective mixing settler; the first partition (2) between the mixing chamber (A) and separating chamber (B) having a lower height than the second partition (3) between the separating chamber (B) and the settling chamber (C); the first partition (2) being so arranged that its upper edge is at a level lower than the upper edge of the second partition (3) so as to permit a portion of the alcoholic phase, which is separated in the upper half portion of the separating chamber (B), to be returned to the mixing chamber (A); the second partition (3) reaching with its lower edge down to a level lower than the lower edge of the first partition (2) and also into the aqueous salt phase accumulating downstream of the chambers (A), (B) and (C); the second partition (3) being provided with a passageway (8) above the phase separation line of the two liquid phases separated from one another in the separating chamber (B); the individual mixing settlers (1) being so arranged serially one upon another that a bottom outlet for aqueous salt phase of each mixing settler (1), except that of the lowest mixing settler, simultaneously serves as the feeder (6) for the next mixing settler placed immediately downstream thereof; and the outlet (7) of each individual mixing settler, except that the uppermost mixing settler, being connected to the feed pipe (5) of the next following mixing settler.

2. The apparatus as claimed in claim 1, wherein the feed pipe (5) of the lowest mixing settler (1) is connected to a container (9) for the alcohol/mineral acid-mixture and the feeder (6) of the uppermost mixing settler (1) is connected to a container (10) for the phosphate solution or suspension.

3. The apparatus as claimed in claim 1, comprising three to six mixing settlers (1).

* * * * *